S. C. COLLINS.
BRAKE RIGGING.
APPLICATION FILED JULY 3, 1912.
1,065,780.
Patented June 24, 1913.
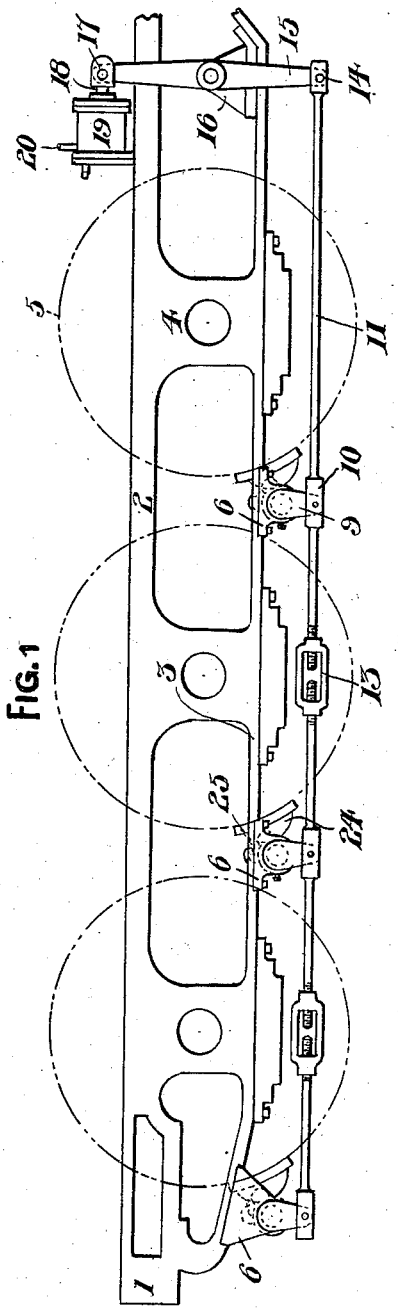
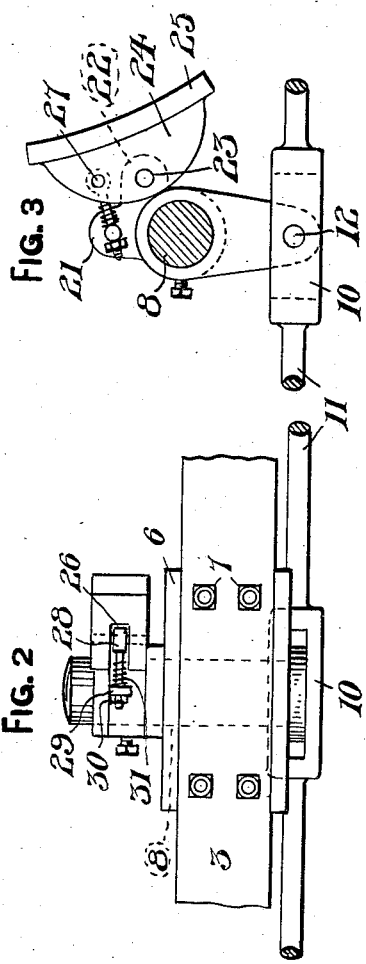
WITNESSES
INVENTOR
S. C. Collins
BY
ATTORNEYS

UNITED STATES PATENT OFFICE.

SIMON C. COLLINS, OF MEADVILLE, PENNSYLVANIA.

BRAKE-RIGGING.

1,065,780.  Specification of Letters Patent.  Patented June 24, 1913.

Application filed July 3, 1912. Serial No. 707,547.

*To all whom it may concern:*

Be it known that I, SIMON C. COLLINS, a citizen of the United States of America, residing at Meadville, in the county of Crawford and State of Pennsylvania, have invented certain new and useful Improvements in Brake-Rigging, of which the following is a specification, reference being had therein to the accompanying drawings.

This invention relates to a brake rigging, and the primary object of my invention is to provide positive and reliable means, in connection with the trucks of rolling stock as a locomotive, for expeditiously and economically applying brakes to the wheels of a truck, without subjecting the frames of a truck to stresses and strains that are liable to fracture parts thereof.

Another object of this invention is to furnish a beamless brake rigging with adjustable brake shoes that can be set whereby when the brakes are applied the shoes will snugly engage the periphery of the wheels of a truck, thereby obviating wear on any particular point upon a brake shoe.

A further object of this invention is to eliminate the use of beams in connection with air brakes and to provide a mechanical construction that is inexpensive to manufacture, easy to install and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of a truck frame provided with a brake rigging in accordance with this invention, Fig. 2 is a plan of a portion of the brake rigging, Fig. 3 is an enlarged side elevation of the same.

The reference numeral 1 denotes the side frame of a truck, said frame having a top rail 2 and a bottom rail 3 connected by bearings 4 for the revoluble car wheels 5 of the truck. This frame may be of any suitable design and it is to the bottom rail 3 of the truck frame that I attach the brake rigging.

The reference numerals 6 denote hangers that are bolted or otherwise connected, as at 7 to the bottom rail 3, said hangers being arranged in proximity to the periphery of the wheels 5. Journaled in said hangers are rock shafts 8 and mounted upon the upper ends of said shafts are cranks 9. The ends of the cranks 9 extend into oblong links 10, carried by a reach rod 11, said cranks having the ends pivotally mounted in said links by transverse pins 12. The reach rod 11 has turn buckles 13, whereby the length of the rod can be increased or decreased as occasion may demand. One end of the reach rod 11 is pivotally connected by a pin 14 to the lower end of a lever 15 that is pivotally supported by a bearing 16, carried by the bottom rail 3 of the truck frame 1. The upper end of the lever 15 is loosely connected, as at 17 to a piston rod 18 that extends into an air cylinder 19. The air cylinder 19 is supported by the top rail 2 of the frame 1 and has suitable connections 20 with the air brake system of a car or train (not shown).

Mounted upon the inner end of the rock shafts 8 are brake cranks 21, said cranks having apertured lugs 22. Pivotally connected to the apertured lugs 22 by pins 23 are the webs 24 of brake shoes 25. The webs 24 are recessed to retain the lugs 22 and are provided with additional recesses 26. Pivotally mounted in the recesses 26 by transverse pins 27 are eye bolts 28. These bolts extend through eyes 29, carried by the brake cranks 21, said eye bolts having nuts 30 retaining the same in the eyes 29. Encircling the eye bolts 28, between the eyes 29 and the webs 24 of the brake shoes 25 are coiled compression springs 31. These springs cushion a rearward movement of the upper ends of the shoes 25, consequently by adjusting the nuts 30, the shoes 25 can be positioned whereby they will evenly wear upon the peripheries or treads of the wheels 5.

From the foregoing it will be observed that each truck frame has its own rigging and that the use of transverse beams is eliminated in connection with the brakes. In eliminating such beams a clear and unobstructed path is provided between the wheels 5 and under the axles thereof, consequently there is little, if any, liability of disconnected riggings catching on ties or frogs and causing wrecks. My invention further possesses the advantage of having a uniform and direct action, each and every brake shoe being applied in unison and alike, and it is obvious that easy access is had to the brake rigging and that comparatively few parts are used in its construction.

It is thought that the operation and utility of the brake rigging will be apparent without further description, and while in the drawing there are illustrated the preferred embodiments of the invention, it is to be understood that the structural elements are susceptible to such variations and modifications as fall within the scope of the appended claim.

What I claim is:—

A brake rigging comprising the combination with the bottom rail of a truck frame provided with a depending hanger, of a rock shaft mounted in the hanger and projecting from each side thereof, a crank depending from the outer end of said shaft and capable of being connected to an actuating mechanism for rocking the shaft, a brake shoe supporting crank connected to the inner end of said shaft and extending upwardly therefrom, a forwardly projecting lug integral with the front edge of said supporting crank intermediate its ends, a brake shoe provided with a rearwardly extending web formed with a recess into which extends said lug, means for pivotally connecting the lug to the web, a bolt having its forward end extending into and pivotally connected to said web above said lug, means for slidably connecting the other end of said bolt to said supporting crank, and a spring mounted upon the bolt and interposed between said means and said web.

In testimony whereof I affix my signature in the presence of two witnesses.

S. C. COLLINS.

Witnesses:
   Rose Collins,
   C. E. North.

---

Copies of this patent may be obtained for five cents each, by addressing the "Commissioner of Patents, Washington, D. C."